G. M. BRILL.
Car-Truck.
No. 202,922.    Patented April 30, 1878.
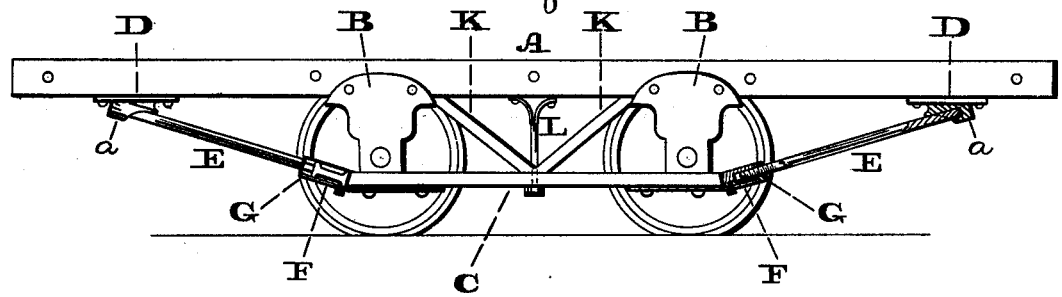
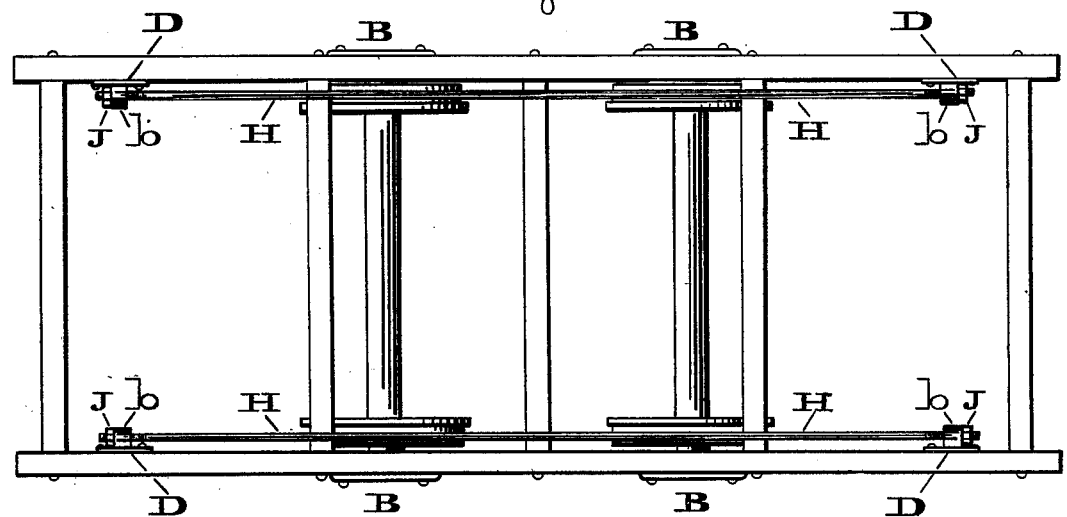
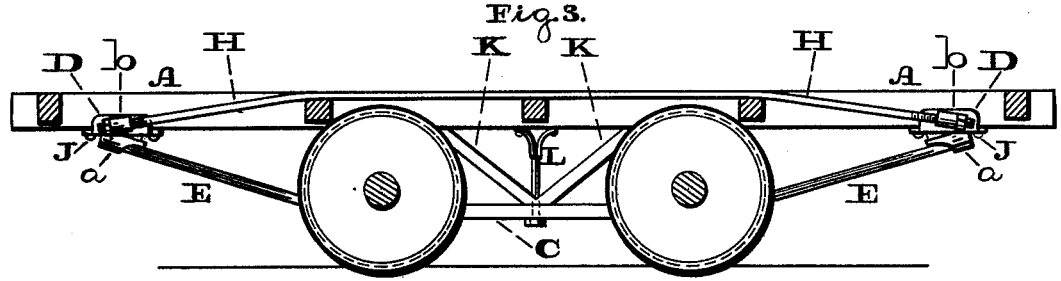
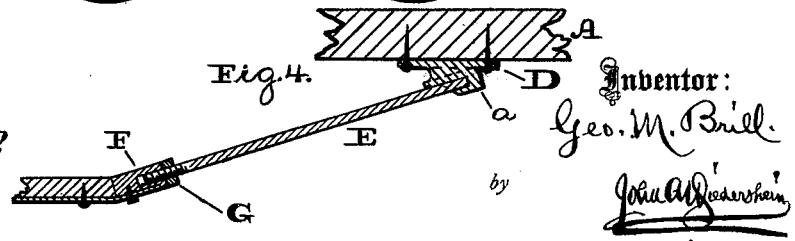
Witnesses: Lewis F. Brous, A. P. Grant.
Inventor: Geo. M. Brill.
by John A. Wiedersheim, Attorney.

UNITED STATES PATENT OFFICE.

GEORGE M. BRILL, OF PHILADELPHIA, PENNSYLVANIA.

IMPROVEMENT IN CAR-TRUCKS.

Specification forming part of Letters Patent No. 202,922, dated April 30, 1878; application filed July 30, 1877.

*To all whom it may concern:*

Be it known that I, GEORGE M. BRILL, of the city and county of Philadelphia, and State of Pennsylvania, have invented a new and useful Improvement in Bracings for Car-Trucks and Car-Bodies, which improvement is fully set forth in the following specification and accompanying drawings, in which—

Figure 1 is a side elevation of the supporting-frame of a car-body having my bracing applied thereto. Fig. 2 is a top or plan view thereof. Fig. 3 is a longitudinal vertical section thereof. Fig. 4 is an enlarged sectional view of a detached portion.

Similar letters of reference indicate corresponding parts in the several figures.

My invention relates to an improvement in bracings for car trucks and bodies; and consists, first, in under brace-rods adapted to brace and elevate the ends of the car truck or frame by the adjustment of nuts which are located upon the said rods between their respective bearings, in combination with upper brace-rods, which are adapted, by means of nuts upon their ends, to take up the strain upon the said car-frame ends when the same are elevated from a sagging position; secondly, in central braces provided with tightening-nuts at top or bottom ends, in combination with under and over brace-rods, all adapted for the purpose of bracing and bringing the truck or frame into proper position; thirdly, in saddles secured upon the car or truck frame, the same having bearings for the over and under brace-rods, all substantially as hereinafter more fully set forth and claimed.

Referring to the drawings, A represents a car-truck or the supporting-frame of a car-body; B, the pedestals, and C the connecting-bars thereof. On the under side of the side pieces of the truck or frame A there are secured saddles D, which have connected to them or formed with them, on their lower faces, sockets $a$, into which project the upper ends of diagonally-extending rods E E, whose lower ends project into sockets F, which are secured to or formed with the connecting-bars C, at the front and rear ends thereof. The ends of the rods which project into the sockets F are screw-threaded, and on the same are fitted nuts G, which are adapted to bear against the sockets F, as more readily seen in the enlarged sectional view, Fig. 4.

The inner sides of the saddles D have secured to or formed with them eyes $b$, into which are fitted the ends of rods H, which extend horizontally along the sides of the truck or frame A, and bend or curve over or through the transverse pieces thereof; and on said ends of the rods H, outside of the eyes $b$, are nuts J, for tightening purposes.

Between the side pieces of the truck or frame A and the connecting-bars C, at the central portions thereof, there are braces K, which extend diagonally in opposite directions and meet at top or bottom; and to said pieces of the truck or frame A and the connecting-bars C, at the central portions thereof, there are secured standards L, which are provided with tightening-nuts at top or bottom.

In order to brace the truck or frame, the nuts G, bearing against the sockets F, are turned so as to force the rods E against the sockets $a$ of the saddle D, whereby the ends or front and rear of the truck or frame of the car will be elevated; then tighten the nuts J of the rods H against the eyes $b$, and said rods H will serve to take up the strain on the ends of the truck or frame, or hold up said ends, and thus the truck or frame will be greatly braced, stiffened, or strengthened by the combined action of bracings above and below. Should the truck or frame sag, the nuts G will be properly turned so as to restore the ends of the truck or frame to their proper set; then tighten the nuts J of the rod H, the result being the same as that just described. Furthermore, the central bracing K and standards L will be employed for the direct bracing action on the center of the truck or frame, judgment being necessary for the tightening of the end bracing for co-operative action with the central bracing, when desired or necessary.

It is evident that the bracings are applicable to car-trucks as well as to the frames of car-bodies, and the action will be similar in both cases.

It will also be noticed that the nuts G, fitted on the rods E and bearing against the sockets F, are located between said sockets F and the saddles D, and thus they are so disposed as to be conveniently accessible from all sides.

Having thus described my invention, what I claim as new, and desire to secure by Letters Patent, is—

1. The under brace-rods E, adapted to brace and elevate the ends of the car truck or frame by the adjustment of nuts, which are located upon the said rods between their respective bearings, in combination with the upper brace-rods H, which are adapted, by means of nuts upon their ends, to take up the strain upon the said car-frame ends when the same are elevated from a sagging position, as above, all substantially as herein shown and described, and for the purposes set forth.

2. The central braces L, provided with tightening-nuts at top or bottom ends, in combination with the under brace-rods C E and the over brace-rods H, all adapted for the herein-described co-operative action of bracing and bringing the truck or frame into proper shape, as shown and set forth.

3. The saddles D, secured upon the truck-frame, and having bearings $a$ $b$ for the over and under brace-rods E H, substantially as herein shown and described.

GEO. M. BRILL.

Witnesses:
JOHN A. WIEDERSHEIM,
H. E. HINDMARSH.